(12) United States Patent
Chopard et al.

(10) Patent No.: US 11,984,573 B2
(45) Date of Patent: May 14, 2024

(54) ELECTRIC BATTERY THERMAL-MANAGEMENT STRUCTURE

(71) Applicant: HUTCHINSON, Paris (FR)

(72) Inventors: Fabrice Chopard, Saint Martin d'Heres (FR); Clément Blanchard, Amilly (FR)

(73) Assignee: HUTCHINSON, Paris (FR)

( * ) Notice: Subject to any disclaimer, the term of this patent is extended or adjusted under 35 U.S.C. 154(b) by 444 days.

(21) Appl. No.: 17/431,416

(22) PCT Filed: Feb. 13, 2020

(86) PCT No.: PCT/FR2020/000031
§ 371 (c)(1),
(2) Date: Aug. 16, 2021

(87) PCT Pub. No.: WO2020/165508
PCT Pub. Date: Aug. 20, 2020

(65) Prior Publication Data
US 2022/0123389 A1    Apr. 21, 2022

(30) Foreign Application Priority Data
Feb. 14, 2019   (FR) ........................ 1901534

(51) Int. Cl.
*H01M 10/6557*   (2014.01)
*B60L 50/64*     (2019.01)
(Continued)

(52) U.S. Cl.
CPC ......... *H01M 10/6557* (2015.04); *B60L 50/64* (2019.02); *B60L 58/12* (2019.02);
(Continued)

(58) Field of Classification Search
CPC ........... H01M 10/6557; H01M 10/482; H01M 10/486; H01M 10/625; H01M 10/63;
(Continued)

(56) References Cited

U.S. PATENT DOCUMENTS

| 2012/0308868 A1 | 12/2012 | Kruger et al. |
| 2013/0280566 A1* | 10/2013 | Chung ................ H01M 50/209 429/83 |

(Continued)

FOREIGN PATENT DOCUMENTS

| EP | 2 993 435 A1 | 3/2016 |
| FR | 3 060 863 A1 | 6/2015 |

OTHER PUBLICATIONS

International Patent Application No. PCT/FR2020/000031, International Search Report and Written Opinion dated May 29, 2020, 15 pgs.

*Primary Examiner* — Adam A Arciero
(74) *Attorney, Agent, or Firm* — Cozen O'Connor

(57) ABSTRACT

The invention relates to an assembly comprising a plurality of cells (10) of an electric vehicle battery (1) between which a first passage (17) may receive fluid via a first supply (27). On another side (11b) of the cells, a second passage (19) may receive fluid via a second supply (29). Around the cells, a peripheral passage (21) may also receive fluid via another supply (25). The second passage (19) and/or the peripheral passage (21) is interposed between a thermal insulator (33) and two successive cells. Flow control means (47) provide a thermal exchange fluid flow through at least one of the first, second and additional fluid supplies during a first time period and through at least two of the first, second and additional fluid supplies during a second time period.

20 Claims, 10 Drawing Sheets

(51) Int. Cl.
- *B60L 58/12* (2019.01)
- *B60L 58/26* (2019.01)
- *B60L 58/27* (2019.01)
- *H01M 10/48* (2006.01)
- *H01M 10/625* (2014.01)
- *H01M 10/63* (2014.01)
- *H01M 10/658* (2014.01)
- *H01M 50/209* (2021.01)
- *H01M 50/249* (2021.01)
- *H01M 50/289* (2021.01)

(52) U.S. Cl.
CPC ............... *B60L 58/26* (2019.02); *B60L 58/27* (2019.02); *H01M 10/482* (2013.01); *H01M 10/486* (2013.01); *H01M 10/625* (2015.04); *H01M 10/63* (2015.04); *H01M 10/658* (2015.04); *H01M 50/209* (2021.01); *H01M 50/249* (2021.01); *H01M 50/289* (2021.01); *B60L 2240/545* (2013.01); *B60L 2240/80* (2013.01); *H01M 2220/20* (2013.01)

(58) Field of Classification Search
CPC ........... H01M 10/658; H01M 10/6568; H01M 2220/20; B60L 50/54; B60L 58/12; B60L 58/26; B60L 58/27; B60L 2240/545; B60L 2240/80
See application file for complete search history.

(56) References Cited

U.S. PATENT DOCUMENTS

2013/0316211 A1 11/2013 Myung-chul et al.
2018/0175466 A1* 6/2018 Seo .................. H01M 10/6554

\* cited by examiner

ELECTRIC BATTERY THERMAL-MANAGEMENT STRUCTURE

CROSS-REFERENCE TO RELATED APPLICATIONS

This application is a 35 U.S.C. § 371 filing of International Application No. PCT/FR2020/000031 filed Feb. 13, 2020, which claims the benefit of priority to French Patent Application No. 1901534 filed Feb. 14, 2019, which is incorporated herein by reference in its entirety.

TECHNICAL FIELD OF THE INVENTION

The present invention relates to the field of thermal management.

In particular, this concerns an assembly allowing the thermal management of a temporary heat producing element.

PRIOR ART

In an electric storage battery, it may be very useful to be able to regulate the operational temperature of cells which heat up when they produce current and which favourably must remain within a precise temperature range whatever the external temperature conditions even when the cells are stopped.

The term "battery" means "electrical device" and is therefore to be understood as any device that generates and/or converts and/or stores electricity, or as an "electrical device (or power supply system) that heats up and operates within a preferred temperature range that is important to manage". Electrochemical devices are therefore concerned.

In this context, it is therefore conceivable that it may be necessary, depending on the situation:
to isolate from the external environment or to manage the temperature evolution of one or more electric battery cells,
and/or to delay, or on the contrary, encourage, the propagation of a thermal flow out of or towards these cells.

Circulating at least one fluid in an assembly adapted to participate in this thermal management may then also be necessary.

There are such assemblies which have, for this purpose, fluid flow passages between two layers of material, between an inlet and an outlet for the fluid, so that thermal insulation—if the layers are thermally insulating—or thermal exchange—e.g. if the layers contain a PCM (an agreed name for a phase change material), for example, between a liquid and a solid—is achieved in relation to the fluid.

Thus, FR3015780 discloses the use of fluidic channels arranged in a PCM and allowing a circulation of a heat-transfer fluid, in particular a liquid. The fluidic channels are formed in a rigid block to hold them in place as the PCM phase change material changes to a liquid state. This is a fairly complex assembly to make. In addition, there is no indication of how the shape of the PCM layers or the "rigid block" to hold the fluidic channels in place might be achieved.

FR 3 060 863 discloses another solution where a module containing a phase change material is arranged between a first and a second electric battery cell, in thermal exchange with them. An air passage exists on both sides of the module, so as to allow air circulation between the first cell and the module and between the second cell and the module.

DISCLOSURE OF THE INVENTION

Amongst the problems that we wanted to solve here are the following:
the one related to the efficient realization of assemblies adapted to participate in a thermal management of cells or groups of cells, in the case where variable operating conditions are encountered, and/or
the one related to the control both of a nominal operating situation of these cells and of an abnormal, excessive heating or even cooling situation of at least one of said cells.

SUMMARY OF THE INVENTION

A proposed solution to some or all of the above drawbacks and/or problems thus consists of an assembly comprising:
a plurality of cells or of groups of cells of a vehicle electric battery, of which at least:
a first cell and a second cell separated from each other by a space, or
a first group and a second group of cells separated from each other by a space,
at least two of:
at least one first fluid passage passing in said space, located between two opposing first sides facing each other:
on the first cell and on the second cell respectively, or
on the first group and on the second group of cells respectively, the first fluid passage being connected to a first fluid supply to be circulated in heat exchange with the first and second cells or the first and second groups of cells,
at least one second fluid passage located on second sides:
of the first cell and of the second cell respectively, or
of the first and second groups of cells respectively, the second fluid passage being connected to a second fluid supply to be circulated in thermal exchange with the first and second cells or the first and second groups of cells, and,
at least one peripheral fluid passage located around the cells or groups of cells at least one peripheral fluid passage located around the cells or groups of cells, in heat exchange with them, on sides other than said first sides of the cells or groups of cells, respectively, said peripheral fluid passage being connected to an additional fluid supply to be circulated in thermal exchange with said cells or groups of cells, and
a thermal insulator located such that said second fluid passage or peripheral fluid passage is interposed between the thermal insulator, and:
at least the first and second cells, or
at least the first and second groups of cells.
Alternatively, the aforementioned assembly shall be such: that it will comprise, in addition:
at least one structure containing (at least) one phase change material, the structure being arranged between two opposing first sides facing each other:
of the first cell and of the second cell respectively, or
of the first and second groups of cells respectively,
or at least one additional structure containing a phase change material and arranged around the cells or groups of cells, that in said space the fluid will be caused to flow in thermal exchange with the phase change material of the structure, and/or that in said peripheral fluid passage the fluid will be caused to flow in thermal exchange with the phase change material of said additional structure In this way, real efficiency may be expected in the thermal management of the cells or groups of cells versus their optimal operating temperature range.

In the prior art, it has never been disclosed that, as proposed herein, a thermal management "assembly" or system of a battery, such as a storage battery, comprising three circuits (referred to above as "passages") for thermal regulation, is implemented, at once:

a first circuit passing between two adjacent cells, a second circuit passing around the stack of cells (whatever the direction of this stack: vertical or another orientation of stack), a third circuit passing:

on (along) one face of the cell(s) other than the one along which the first circuit passes, and possibly also on (along) one face of the cell(s) other than the one along which the second circuit passes.

In particular, the face along which the third circuit passes may be the bottom side of the battery (facing down).

Any of said "structure" may comprise a protective envelope (such as a plastic bag) containing the phase change material(s). This phase change material(s) may also be contained in a coating matrix, for example a rubbery one, avoiding in particular any leakage problem, even with solid/liquid phase PCMs.

It is further specified that, in the text:
'thermally conductive' means with a conductivity greater than or equal to 0.5 W/m·K−1,
'thermally insulating' means with a conductivity less than or equal to 0.2 W/m·K−1,
that, probably, the above-mentioned vehicle will be hybrid or electric and that the aforementioned battery will be used for its autonomous displacement (see later in the description).

Whether or not there is a structure with PCM, it is also proposed that, in order to finely regulate the battery temperature, avoiding both potentially destructive runaways and performance losses due to inappropriate temperature jumps, that:

in conjunction with the first, second and/or additional fluid supplies, fluid flow control means acting to ensure a circulation of fluid in so-called thermal exchange are provided, with such a circulation of fluid preferably being in thermal exchange:
via at least one of the first, second and/or additional fluid supplies, during a first period of time, and
via at least two of the first, second and/or additional fluid supplies, during a second period of time.

Said fluid flow control means may further comprise:
valves on the first, second and/or additional fluid supplies, and
means for controlling the valves acting in accordance with temperature data of said cells or groups of cells and/or data relating to the electrical charge or discharge of the battery.

This will lead to a finely controlled active thermal management of the battery.

The term 'valve' must be understood as any obturator allowing the passage or prohibiting the passage of a fluid in a conduit (solenoid valve, tap . . . ).

When applied in a vehicle arranged in an outdoor environment, the subject assembly may usefully be such that the valve-control means comprise:

a first temperature sensor for sensing the temperature on or near said cells or groups of cells, and a second temperature sensor for sensing the temperature of the environment outside the vehicle, and/or a sensor (or computing means) for acquiring data relating to the depth of discharge (DOD) of the battery, and/or the state of charge (SOC) of the battery, means for actuating the valves, and a connected data processing unit:
to said means for actuating the valves, and
to said first and second temperature sensors, and/or to said sensor (or calculation means) for acquiring data relating to the depth of discharge of the battery, and/or to the state of charge of the battery, so that at least some of said actions on the valves take account of:
temperature data from said first and/or second temperature sensors, and/or
data from said sensor (or computing means) for acquiring data relating to the depth of discharge of the battery, and/or the state of charge of the battery.

In this way, the thermal management of the battery may be finely controlled, in a gradual manner, and the unnecessary use of fluid may be avoided.

For the same purpose, it may be foreseen that the said actions on the valves take into account:
temperature data of at least the second temperature sensor during at least the first time period,
temperature data of at least the first temperature sensor during at least the second time period.

In order to achieve the expected thermal efficiency of structures with PCM, it is proposed that in front of a cell, the or each structure is in contact with this cell, without ventilated circulation of fluid between them.

If the or each structure has a solid, continuous surface in front of the cells for non-discrete thermal exchange with them, such a ventilated circulation will be avoided.

If the assembly comprises, in said inter-cell space, at least two of said structures and at least one thermal insulator interposed between said at least two structures, the thermal transfers of the first and second cells between them will be effectively countered, thus avoiding a runaway of the system in case of overheating of one or of some cells.

Again, whether or not there is a structure with PCM, it is also proposed, in order to control the speed of action of the fluid concerned on the temperature of the battery, to circulate this fluid(s) only at certain times, when conditions are suitable. And a preferred solution proposed herein is also that the assembly comprises a device for supplying calories or frigories placed in thermal exchange with at least one of said fluids, upstream of the thermal exchange with the cells.

An alternative or complementary way of dealing with the same issue is for the said assembly to be such:
that it comprises two thermally conductive plates, or two series of such plates then defining a plurality of said second fluid passages arranged in parallel,
that said fluid to be circulated in said first passages is a first fluid, and
that said fluid to be circulated in the second passages is a second fluid different from the first fluid, and,
that the first and second fluids are circulated in separate circuits.

Thus, it will be possible to modulate the thermal exchange provided by these fluids. In particular, a gas and a liquid may be used respectively.

Yet another alternative or complementary way of addressing the same issue is that said peripheral fluid passage communicates with:

the first fluid passage, and/or
the second fluid passage, so that fluid to be circulated therein is at least partly common.

This will allow an economy of means, while being able to make the exchange temperature via the first and/or second passages dependent on that via said peripheral passages. It may then be preferred that the fluid flows first in the peripheral passages and then in said first and/or second passage(s), if both are provided, thereby maximising the overall exchange capacity at the level of the group of cells or the complete battery pack, before the fluid flows in the core, between two cells or two groups of cells.

Yet another possibility is that (a) in which more than one fluid would flow on the same side, in said first and/or second passages and/or in the peripheral passages; typically a gaseous fluid and a liquid on such a side.

This will further increase the thermal exchange on the same side and/or increase the compactness of the assembly.

It could also be foreseen to circulate the said fluids differently, depending on the moment.

For example, the above-mentioned passages could be used to circulate on the same side:

air only, during nominal operation of the battery (in its optimum operating temperature range, i.e. between 25° C. and 35° C. for a Li-ion battery), and
glycol water, during critical operation or rapid charging of the battery.

In other words, it may be expected that:

between two said opposite first sides facing each other, or
on said second sides, or
on said sides other than the first sides of the cells or groups of cells, respectively, there are arranged a plurality of first fluid passages, or a plurality of second fluid passages, or a plurality of peripheral fluid passages, separated from each other, so that different fluids may flow through them without mixing with each other.

Since a goal of this type of "two-in-one" arrangement (multiple fluids passing along the same side) is efficiency in terms of thermal exchange performance, it may be advantageous for at least one of said multiple first or second fluid passages, or multiple peripheral fluid passages to be arranged in contact with a phase change material with which thermal exchange will occur when fluid is flowing. The PCM will enhance the performance of this exchange.

It is specified that this solution (see from (a) above) may be dissociated from the other aspects presented here and thus may be carried out independently of them. This is considered to be an innovation in and of itself (see also description of FIGS. 14 and 15).

In order to control in particular the consumption of the fluid circulating in the second passage(s), or even the use of this fluid in another circuit of the vehicle (such as its water circuit), it is also proposed that the said assembly comprises at least one recycling in which the second fluid passage will communicate with a recirculation circuit. Thus, it will be possible to reintroduce into the second supply (such as a water supply) at least part of the said fluid from the second fluid passage, after passing in the calories or frigories supply device.

In connection with this aspect of the first and second fluids being different from each other, gas/liquid for example, it may be of interest that the said fluid to be circulated in the second passage passes there between:

two thermally conductive plates, or
two series of thermally conductive plates defining a plurality of said second fluid passages arranged in parallel.

Thus, a large exchange surface is combined with a thermally efficient fluid.

Favourably, the (each) second fluid passage and said plates will be arranged under the electric battery, thereby limiting sealing problems due to a liquid fluid.

The invention will, if necessary, be understood in even greater detail from the following, non-limiting, description with reference to the attached drawings.

DETAILED DESCRIPTION OF THE INVENTION (NON-LIMITING EMBODIMENT(S)/EXAMPLE(S) ONLY

Figure 2:
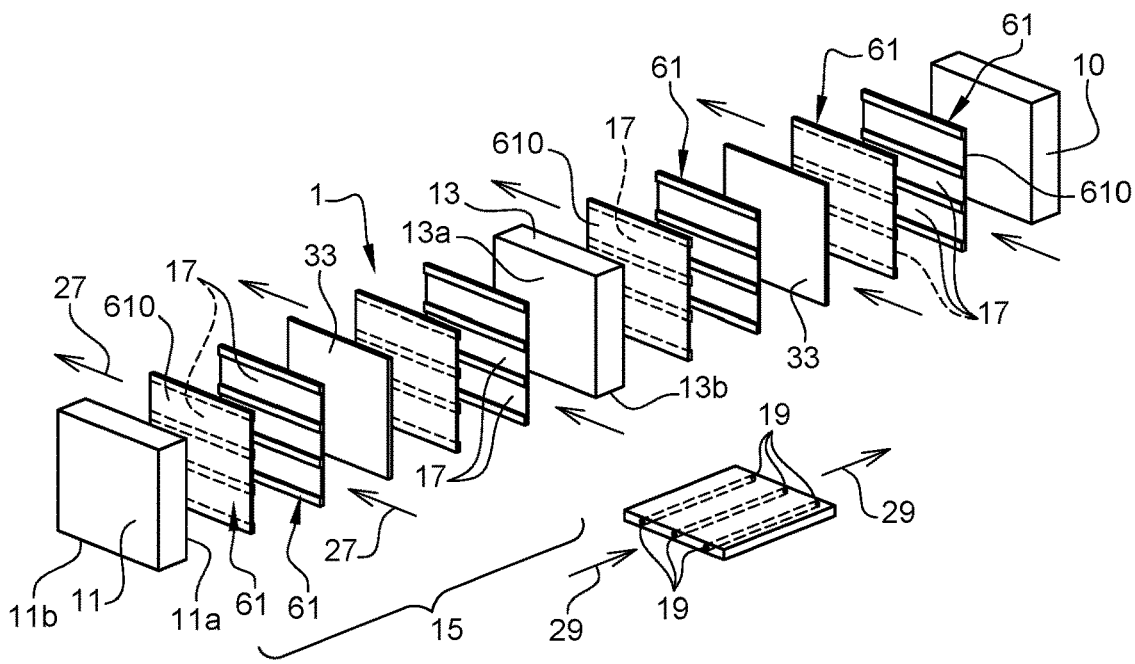
Figure 3:
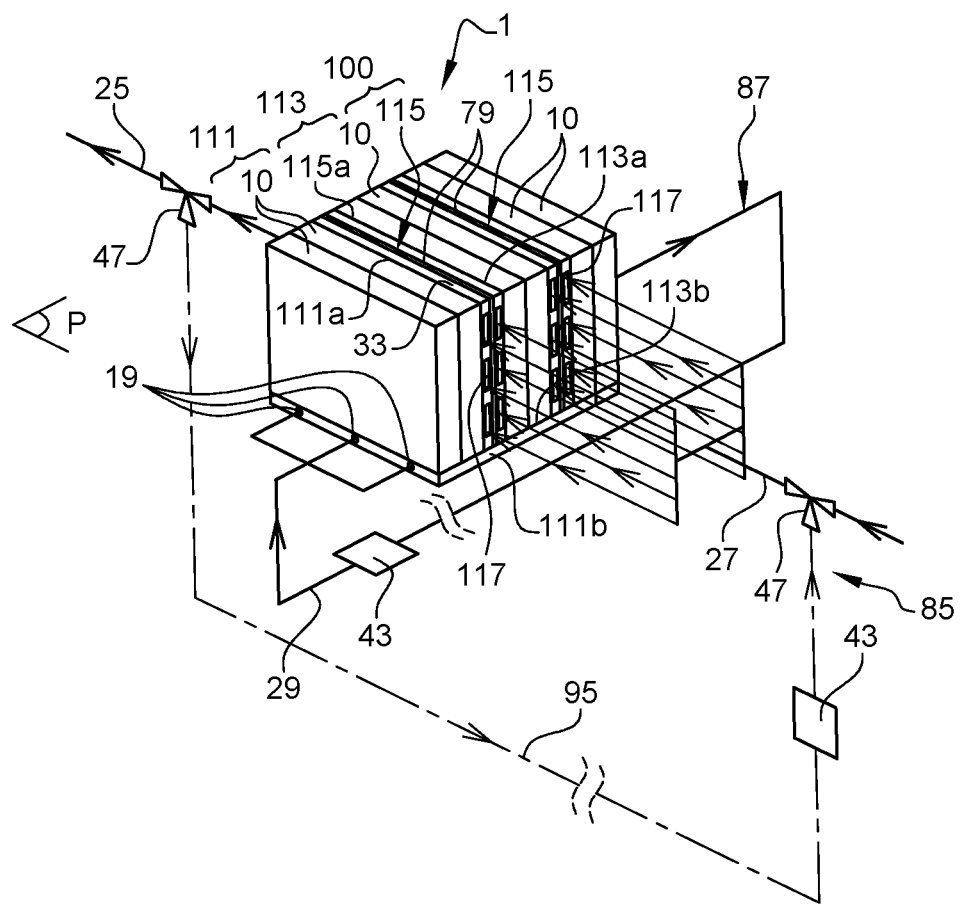
FIG. 3 repeats FIG. 1 in an option of fluid flow still circulating in the core, but between two successive groups of cells.

As stated above and illustrated, one aspect of the invention relates to an assembly, with an arrangement that relates to an electric battery (or battery pack) 1 whose "core" thermal management is individualized:

either by cell 10 (FIGS. 1-2),
or by group 100 of cells (FIG. 3).

Thus, depending on the case, the assembly includes:

a plurality of cells 10 or of groups 100 of cells of a vehicle electric battery 1, of which at least:
a first cell 11 and a second cell 13 separated from each other by a gap 15 located between two opposite first sides (11a, 13a) of the first cell and of the second cell, respectively, facing each other (FIGS. 1-2), or
a first group 111 and a second group 113 of such cells separated from each other by a gap 115 located between two opposite first sides (111a, 113a) of the first group 111 and a second group 113 of such cells, respectively, facing each other (FIG. 3).

In addition thereto, the assembly comprises (at least) a first fluid passage 17 or 117 in the space 15 or 115, located between said two opposing first sides facing each other, as the case may be:
- of the first cell and of the second cell respectively: see sides 11a,13a respectively (FIGS. 1-2), or
- of the first and second groups of cells respectively: see sides 111a,113a respectively (FIG. 3).

The first passage 17 or 117 is connected to a first supply 27 of fluid to be circulated in thermal exchange directly between cells 10 or between groups 100 of cells.

Thus, for example, one of the first passages 17 or 117 will be connected to a first supply 27 of fluid to be circulated in thermal exchange with, and between, the first and second cells 11,13 (FIGS. 1-2) or the first and second groups 111,113 of cells (FIG. 3).

In addition thereto, the assembly also includes (at least) a second fluid passage 19 or 119 located on:
- the second sides 11b,13b of the first cell 11 and of the second cell 13, respectively, or
- the second sides 111b,113b of the first and second groups 111,113 of cells, respectively.

It is understood that said second sides are different from said first sides. The second sides are side by side. They may typically be located in the same plane (see plan P FIG. 3 or 5).

The second passage 19 or 119 is connected to a second supply 29 of fluid to be circulated in thermal exchange with the first and second cells or the first and second groups of cells.

In addition to or in place of the second fluid passage(s) 19 or 119, the assembly comprises (at least) one peripheral fluid passage 21 (FIGS. 4-5) located around the cells 10 or groups 100 of cells (FIG. 4), in thermal exchange with them, on sides, such as 100c, 100d, 100e or 111c, 111d, 100e, other than the said first sides (11a, 13a; 111a, 113b) of the cells 10 or groups 100 of cells respectively.

Thus, this (at least) one peripheral fluid passage 21 may extend along a plurality of walls 23, in particular three adjacent and successive peripheral walls or faces, such as 23c, 23e, 23d surrounding on a plurality of sides or faces the cells 10 or groups 100 of cells.

Figure 4:
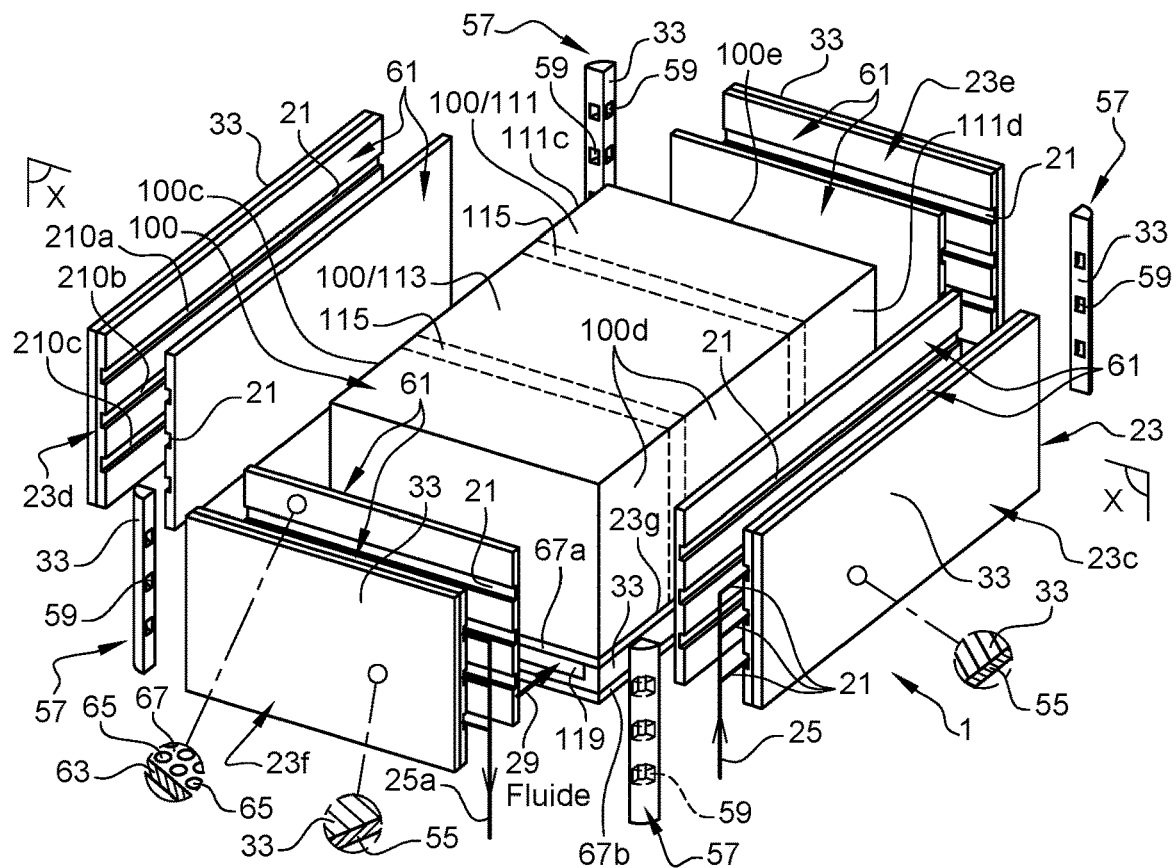
FIG. 4 schematizes (in exploded view) the elements of the assembly conceived according to the invention, around groups of battery cells, to ensure a peripheral thermal management.
Figure 5:
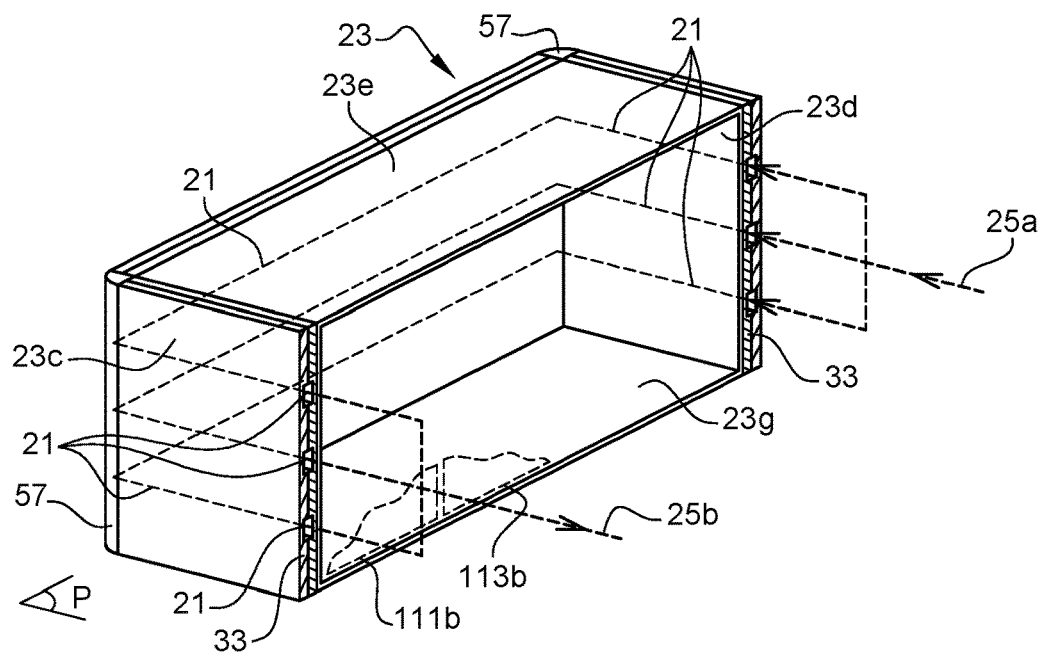
FIG. 5 shows a housing for the peripheral fluid passage(s)

These walls or peripheral faces may be, laterally (for example vertically):
- two opposite sides, such as 23c, 23d FIG. 5,—three successive sides, such as 23c, 23e, 23d FIG. 5, Another possibility:
- four faces, such as 23c,23e,23d,23f (vertical); see FIG. 4.

Another possibility:
- four sides, such as 23c, 23e, 23d (vertical) and 23g (horizontal, bottom); see FIGS. 4-5, or
- five sides, such as 23c, 23e, 23d, 23f (vertical) and 23g (horizontal, bottom).

Indeed, at least a portion of the second fluid passage 19 or 119 on said second sides could be confused with at least a portion of the peripheral fluid passage 21 passing through the wall or face 23g; see FIG. 5, bottom left.

The peripheral passage 21 will be connected to an additional fluid supply 25 (inlet 25a, outlet 25b) to be circulated in thermal exchange with said cells 10 or groups 100 of cells.

The walls 23, functionalised with these internal fluid passages, may form a housing on two, three, four or five sides of the battery.

A priori, one will avoid functionalising in such a manner, with such passages, at least one face of the battery 1.

Figure 6:
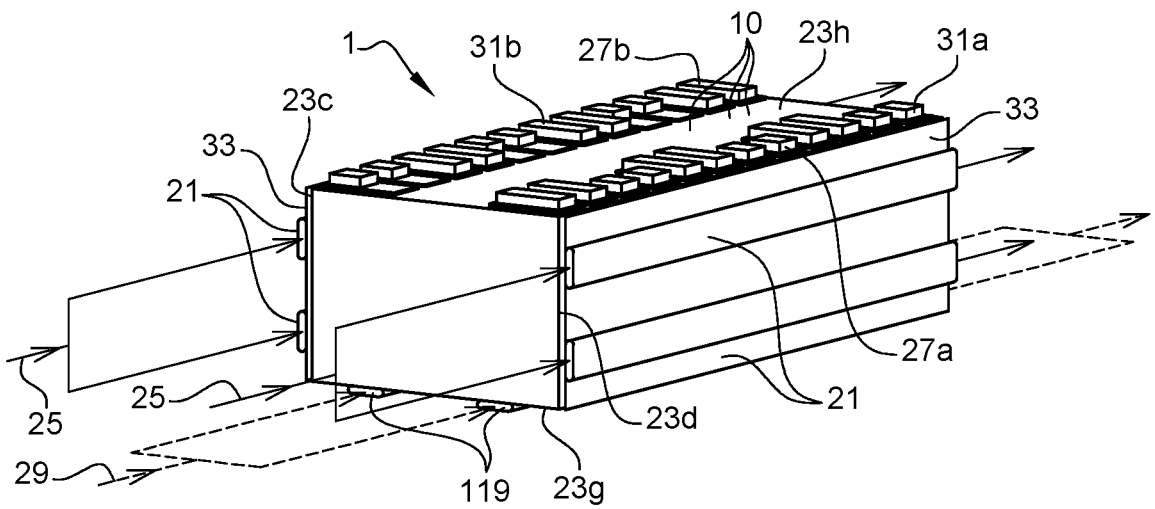
FIG. 6 shows a group of cells with peripheral passages on two opposite sides.
Figure 7:
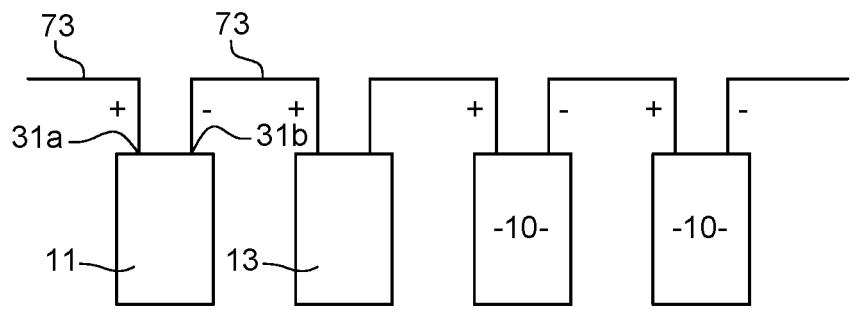
FIG. 7 and FIG. 8 show two possible electrical connections of cells.
Figure 10:
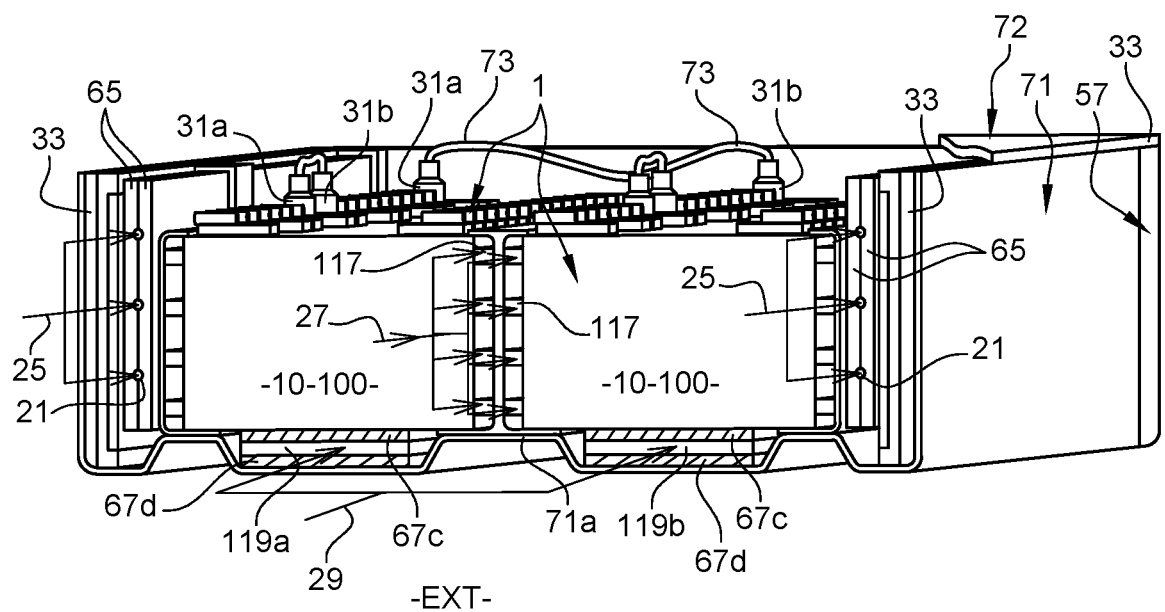
FIG. 10 shows, at the level of the battery pack, such a pack also equipped with the thermal management assembly of the invention, following the X-X section of FIG. 4.

This should often be at least the upper horizontal face, marked 23h in FIG. 6, where the cells 10 (at least the parallelepipedic Li-ion type cells shown as a non-limiting example in the figures) have their electrical connections 31a (terminal +), 31b (terminal −); connections not shown in the other figures, except for FIGS. 7 and 10.

Figure 8:
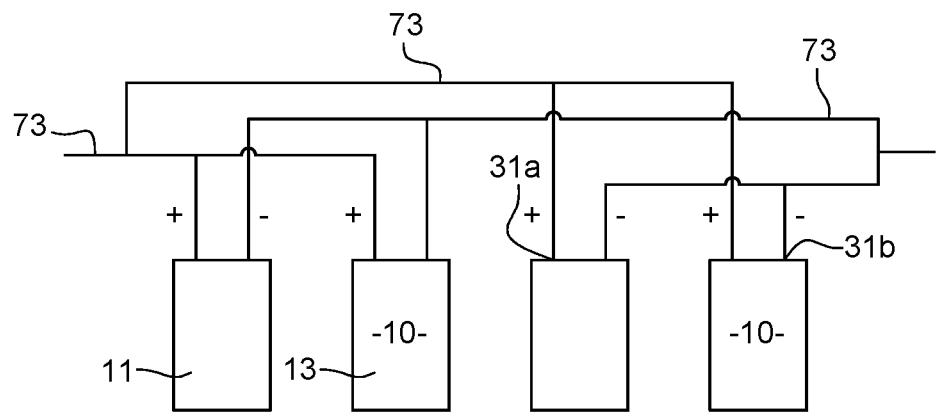

In this respect, it is specified that, as shown in FIGS. 7-8, the electrical connections of these cells 10 via their terminals 31a, 31b may be in series, as in FIG. 7, or in series and parallel, as in the example of FIG. 8.

It should also be noted that, in FIG. 5, the assembly formed by the walls 23 and the corner pillars 57 may be tilted upwards by 90°, so that the open face is then the upper one and so that, as in the version of FIG. 10, a cover may be placed over the face of the battery presenting its connection terminals.

In addition to what has already been mentioned, the assembly of the invention also comprises (at least) a thermal insulator 33 (FIG. 4) located such that said second passage 19 or 119 and/or the peripheral passage 21 is interposed between the thermal insulator 33 and:
- at least the first and second cells, such as 11, 13, or
- at least the first and second groups of cells, such as 111, 113.

The thermal insulation 33 will usefully be in the form of one or more panels, sheets or boards. The thermal insulation 33 may be a porous insulation. It may be placed in a pocket with a closed envelope 55 (FIG. 4). The thermally conductive envelope 55 may be plastic or metal. To form a vacuum bag (VIP type), the envelope 55 shall be gas tight and under partial internal vacuum (e.g. between 10 and $10^4$ Pa).

Thus, the thermal insulator 33 may usefully double at least two opposite sides of the battery pack 1, thus extending around the cells 10 or groups 100 of cells, overall; see FIG. 4.

With two, three or four panels, sheets or plates of thermal insulation 33 on the two, three or four vertical lateral sides of the battery pack 1, and said peripheral passages 21 interposed between this thermal insulation 33 and the vertical outer lateral contour of the battery pack, the battery pack will be usefully protected from its external environment.

For the circulation of the fluid in the peripheral passage(s) 21, corner blocks or pillars 57 may be arranged at the corners, between two adjacent side panels of thermal insulation 33. Each corner block 57 incorporates one or more conduits 59 for individual connection to the opposing peripheral passage(s) 21. Each conduit 59 is curved so that the fluid passes the corresponding angle. Preferably, each corner block 57 should be made of a thermally insulating material (e.g. PU foam). In FIG. 4, arrows mark the inlets and outlets of the fluid 25 at the battery pack.

Once the isolation and fluid circulation capabilities have been provided as above, a further aspect of the invention relates to the flow control of such fluid(s) via the first and, second and/or additional fluid supplies.

More precisely, it is provided for this purpose that the aforementioned assembly also comprises fluid flow control means 35 aimed at ensuring a circulation of fluid(s) in said thermal exchange:
- via at least one of the first, second and additional fluid supplies 25, 27, 29, during a first period of time, and
- via at least two of the first, second and additional fluid supplies 25, 27, 29, during a second period of time.

It will be understood that these first and second time periods are moments included in the time during which the battery is active, i.e. in electrical charge and/or in electrical discharge, both of which may be concomitant.

Figure 9:
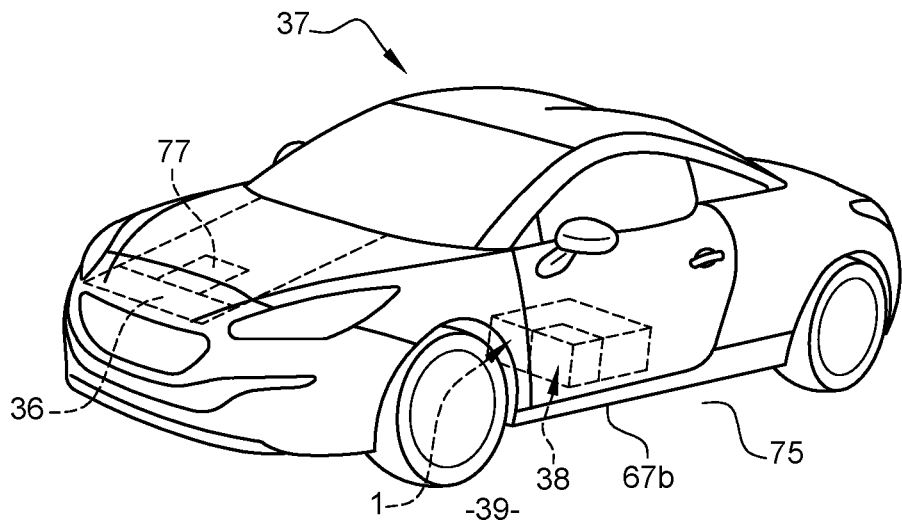
FIG. 9 shows a vehicle equipped with the thermal management assembly of the invention.

For example, suppose a hybrid or electric vehicle 37 is started (FIG. 9).

If it is a hybrid vehicle, there are two engines on board to move the vehicle: an internal combustion engine 36 and an electric motor 38. The battery pack 1 is at least connected to the electric motor 38 to operate it.

In normal operation, the cells of battery 1, for example, lithium-ion cells, which are used for the autonomous movement of the vehicle, will quickly lose energy (discharge during normal driving). For example, cooling air may then be drawn in, via a pump or a fan 41 (FIG. 11), from the external environment 39 (FIG. 9; and EXT FIG. 11 in particular) and pass, if necessary, in an exchanger 43 which may incorporate a dehumidifier. Provision may then be made to pass air as fluid 25 in the peripheral fluid passage 21, which may comprise a series of channels around the periphery of the battery pack 1.

As long as the temperature of the battery pack 1, as sensed by the temperature sensor 45, remains within a predetermined range (typically between 25 and 35° C., for example), the air in the battery pack 1 flows only in the peripheral passage 21 as fluid 25 (first time period). At the outlet, a valve 47 (such as a three-way valve) passes the air into a circuit 49 which sends it either to recycle (branch 51) or to the external environment EXT; branch 53, under the control 95 of the data processing unit 83.

If the temperature sensor 45 detects a temperature of the battery pack 1 above 35° C., for example, then at least two of the passages 17/117 and 19/119 will be activated: The fluid(s) flows 27 and/or 29 will thus intervene, increasing the thermal exchanges with the battery 1, in its immediate environment (second time period).

In this way, the chances of thermally managing the battery pack 1 are optimized.

As noted immediately above, the peripheral fluid passage 21, considered generally as a means for circulating fluid arriving through the power supply 25 around the battery pack 1, may be formed of a series of channels, as marked 210a, 210b, 210c in some of FIG. 4.

This "peripheral fluid passage 21" may thus be defined:
as shown in FIG. 4, by channels integrated in panels,
or by one or more tubes or channels, e.g. circular or rectangular in cross section.

The material of these panels, tubes or channels may be thermally neutral, or even thermally conductive, to promote thermal exchange with the battery 1.

However, it is possible to further refine the thermal management by using phase change materials (PCMs), as already mentioned.

Thus, in an embodiment as illustrated in FIG. 4, and in addition to the above, the aforementioned assembly may also include at least one structure 61 (hereinafter also referred to as a pocket) having a closed envelope 63 containing a phase change material 65 (PCM).

If provided, such a structure 61 will be usefully interposed between the battery pack 1 and the surrounding thermal insulation 33. Like it, the structure 61 may be presented as a series of panels, sheets or plates.

The PCM 65 may be dispersed in a rigid structural matrix 67, so as to form a self-supporting composite body, whatever the phase of the PCM (solid or liquid in particular).

The channels, tubes or spouts of the peripheral fluid passage 21 may be integrated (channels; see FIG. 4) or added (tubes or spouts) to the structure 61.

With such an association between PCM, a circulating fluid (supply 25) and a thermal insulator around it, it will be possible to create a dynamic thermal barrier, the fluid allowing in particular to regenerate the PCM when the time comes.

Returning now to the thermal management via the second passage 19 or 119 (if any), FIG. 10 illustrates an embodiment where the thermal insulation 33 is not provided between the exterior (EXT) and said second passage(s), here marked 119a,119b. There is, however, one around the peripheral passage(s) 21.

A thermally managed housing 71 may form the bottom 71a and at least some of the side walls in one piece. On the upper side, opposite the bottom 71a, an electrically insulating cover 72, which may comprise a layer of electrical insulation 33 and through which the electrical cables 73 pass, will usefully cover the terminals 31a, 31b 31a and close the housing 71 on this side.

In any case, said second fluid passage will usefully pass:
between two thermally conductive plates 67a, 67b (FIG. 4), or
between two series of thermally conductive plates 67c, 67d (FIG. 10) then defining a plurality of said second fluid passages, such as 119a, 119b, arranged in parallel.

Figure 13:
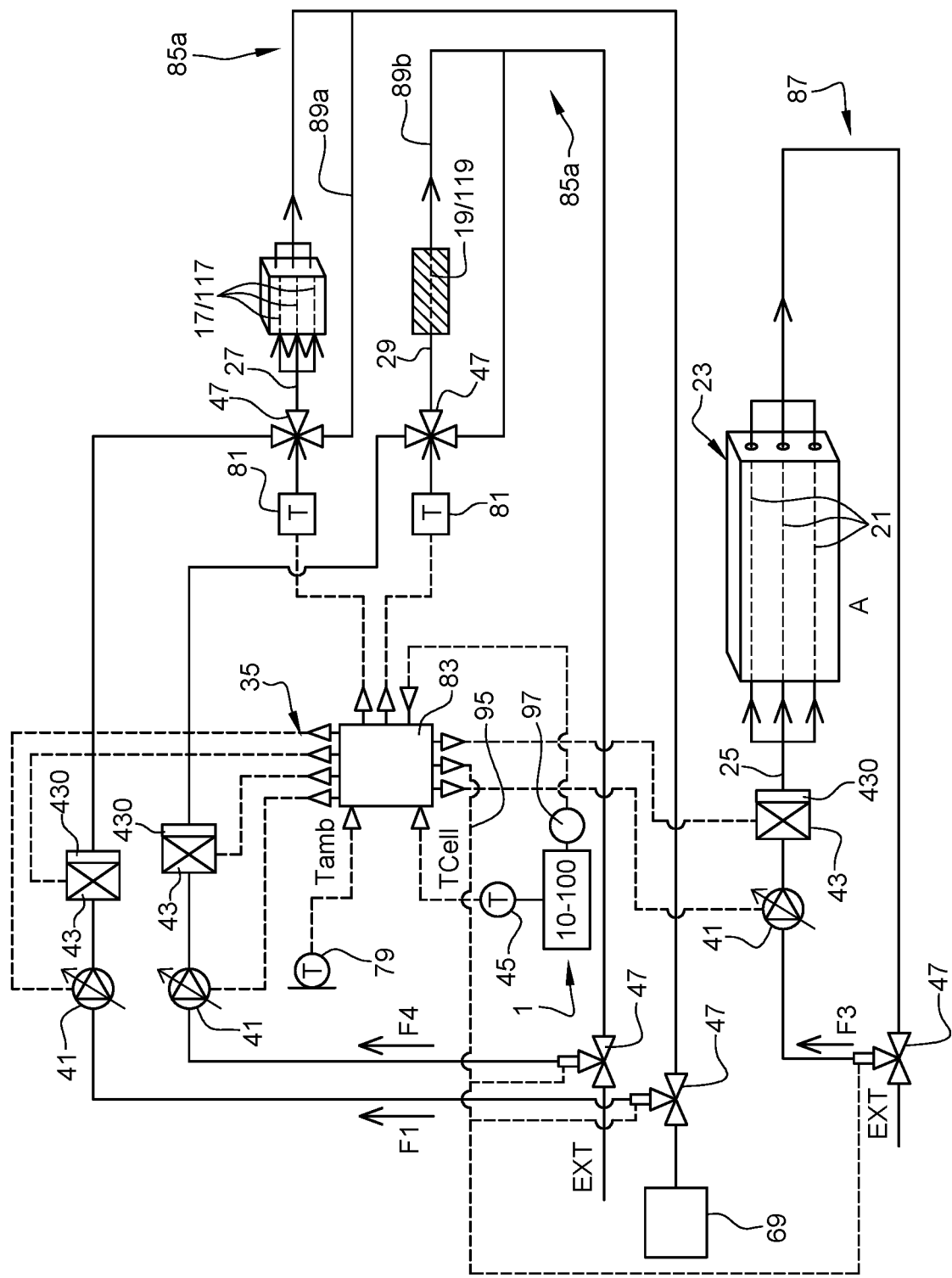

This second fluid passage 19/119 will be all the more interesting if, unlike the first passage 17/117 and peripheral passage 21, it may allow a liquid to circulate, such as water from the vehicle's water system 29 and therefore from a water source 69, as in the example of FIG. 13.

Figure 1:
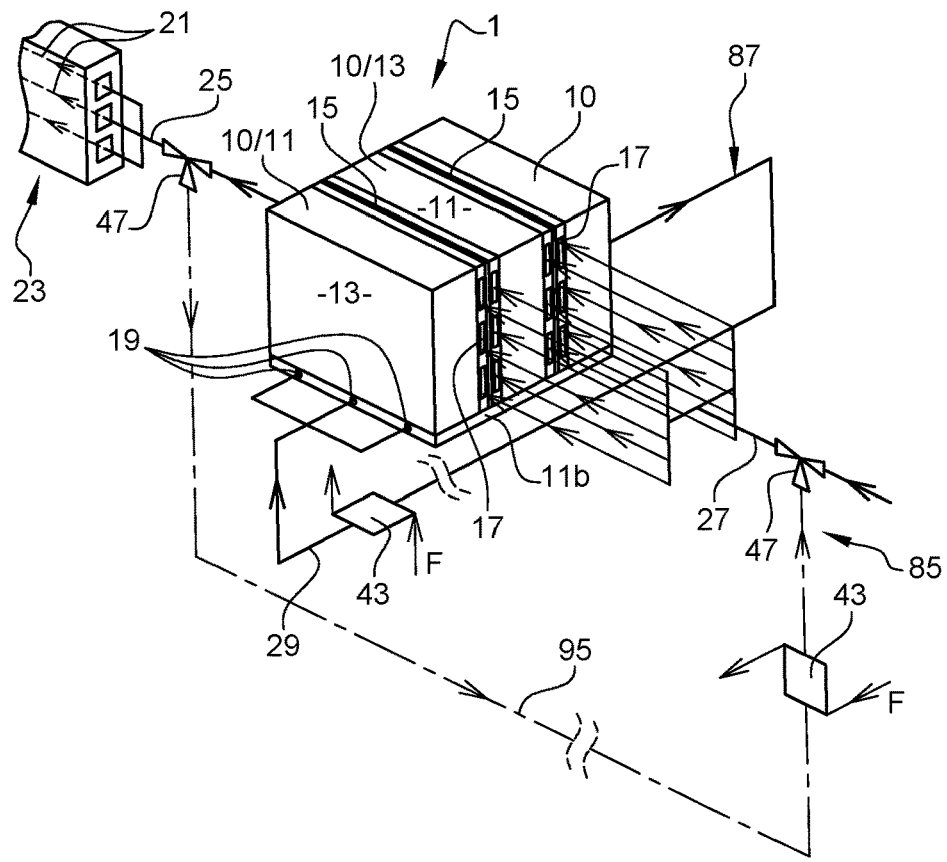
FIG. 1 and FIG. 2 show respectively a reassembled and exploded thermal management assembly of prismatic battery cells with double fluid flow, respectively at the surface (here below) and at the core (between two successive cells)

All the more so with a liquid, the second fluid passage 17/117 will advantageously, together with said plates 67a, 67b or 67c, 67d, be arranged under the battery pack 1, as in the examples of FIGS. 1, 3, 4.

In the example of FIG. 10, the battery pack 1 may therefore be housed in a housing 71 which will be closed at the front (AV) and at the rear (AR) by walls through which at least the power supplies 25, 27, 29 may pass (inlets on one side, outlets on the other), since in the example the three series of passages 21/117/119a-119b are provided.

In the example shown in FIG. 4, the battery pack 1 is also housed in a housing; however, this housing is open at the upper horizontal side, here for the passage of the electrical cables 73 (not shown; see FIG. 7) provided for the electrical supply of the cells 10.

With respect to the thermally conductive plates, such as 67a, 67b (FIG. 4), they may extend, substantially horizontally, beyond the area of the battery pack 1.

Thus, the lower thermally conductive plate, such as 67b, may usefully serve (also) as a structural and/or anti-skid plate (see FIG. 9) by being positioned on the underside of the vehicle, just above the ground 75.

The lower thermally conductive plate 67b will then be metallic.

Returning to the first passage(s) 17/117, it should be noted that the inter-cell space 15, or 115 between two successive groups of cells, may be more or less functionalised.

Thus, it may first be traversed, in its core, between two cells or groups of cells by one or more of said first fluid passage(s) 17/117.

As an alternative or as a complement, we may interpose:
thermal insulation 33, and/or
structures 61 forming panels containing PCM; see FIG. 2.

If such structures 61 are provided, it is proposed, in order to promote thermal regulation via the PCM and as schematised in FIG. 4:
that, opposite a said cell or a said group of cells, the or each structure 61 is in contact against the cell or the group of cells, without ventilated circulation of fluid between them, and/or that the or each structure 61 presents, opposite a cell or a said group of cells, a solid, continuous surface 610, for a non-discrete thermal exchange with it/them.

If, in said space 15/115, thermal insulation 33 is interposed, it will be between at least two successive said structures 61, to counteract heat transfers between (groups of) cells.

The structural presentation of the assembly of the invention being essentially done, we will now present more the circuits which may integrate it and their functioning.

Figure 11:
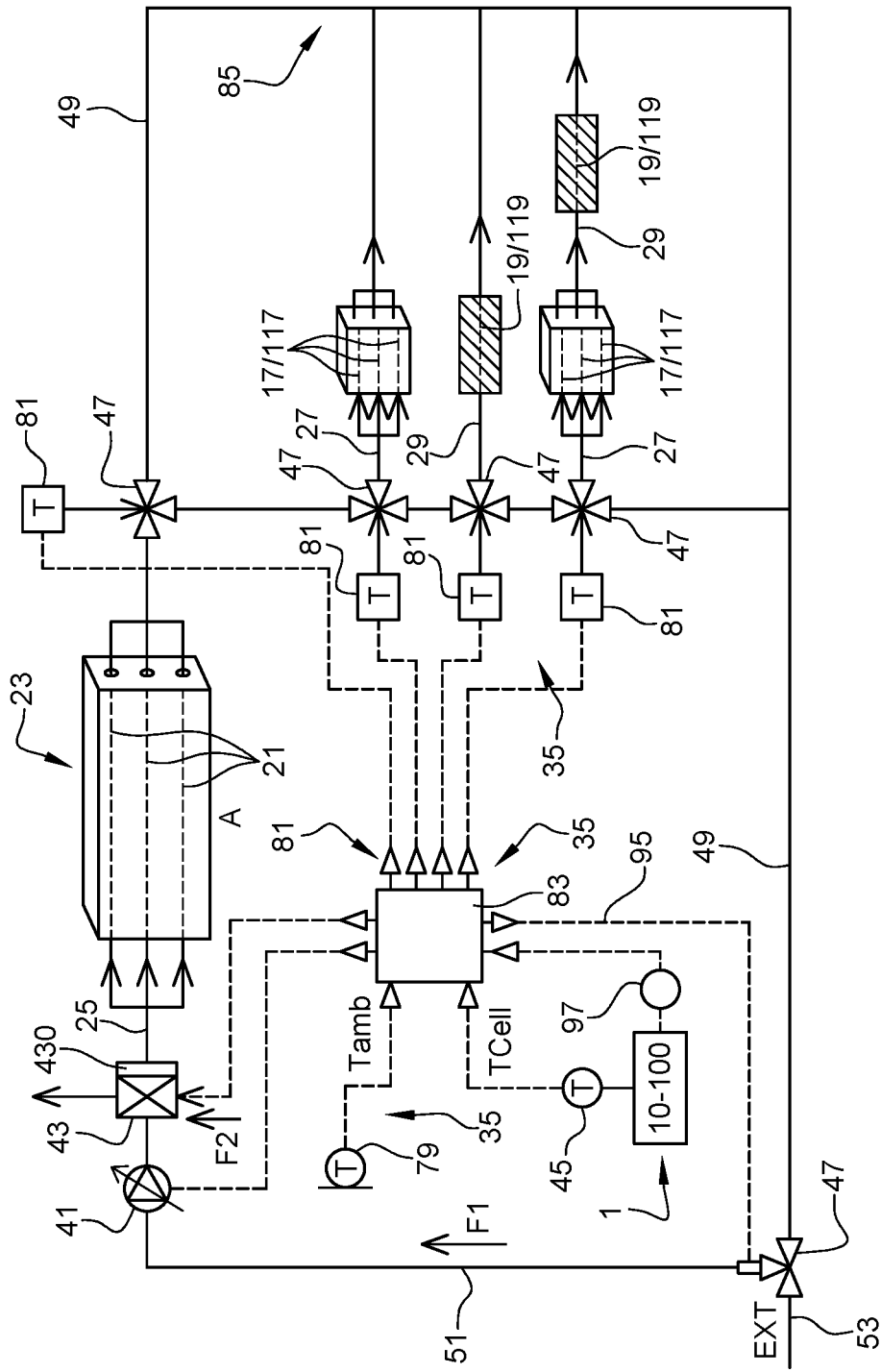
FIG. 11, FIG. 12 and FIG. 13 show three arrangements with the thermal management assembly of the invention, on circuits for one, two and three fluids successively.
Figure 12:
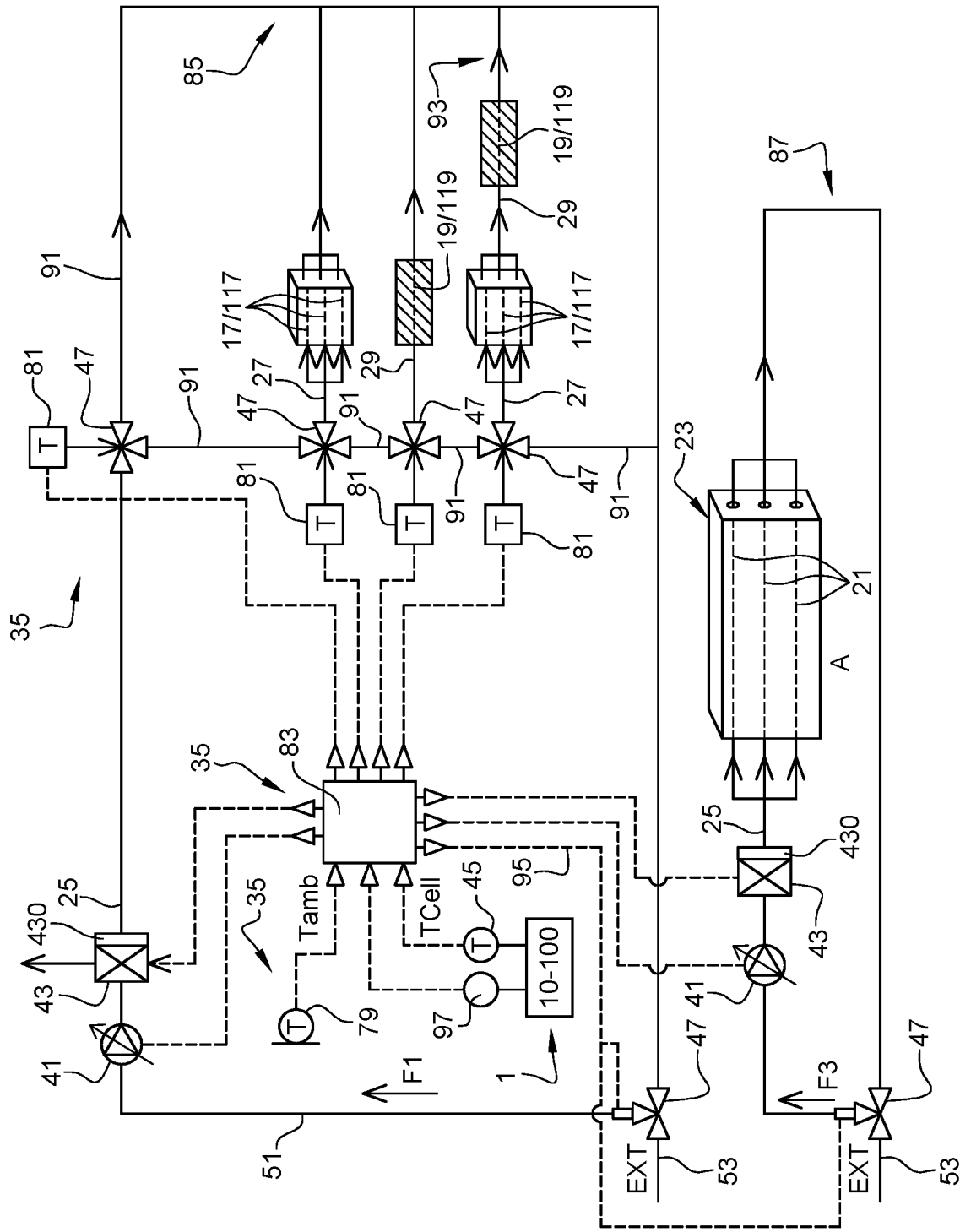

FIGS. 11-13, but also 1 and 3, are then particularly concerned.

The presence, useful for the thermal management of the cells in view of their optimum operating temperature ranges, of devices for supplying calories or frigories 43 placed in thermal exchange with at least one of the said fluids, such as the exchangers situated therefore each upstream of the thermal exchange considered with the cells, has already been noted.

Thus, it will be possible to adapt the temperature of this fluid (supply 25 and/or 27 and/or 29) according to:
the thermal exchange to be carried out via the passages 17/117 and/or 19/119 and/or 21, and/or
the desired state of the PCM 65.

As an alternative or in addition to an exchanger, it is possible to provide, as a device 43 for supplying calories or frigories, at least one of a heating resistor, an interconnection with a vehicle air conditioning device 77, a dehumidifier 430.

Each circuit incorporating an assembly in accordance with the invention also comprises a plurality of valves 47 placed under the control of the aforementioned control means 35.

These valve control means 35 comprise, preferably in combination and connected to a unit 83 (see below):
at least one (so-called first) temperature sensor 45 provided for sensing the temperature on or in the vicinity of at least one said cell 10 or at least one said group 100 of cells,
at least one second temperature sensor 79 for sensing the temperature of the external environment (EXT/39) of the vehicle, and
at least one third sensor 97 for acquiring data relating to the depth of discharge (DOD) of the battery, and/or to the state of charge of the battery (SOC), and
means 81 for actuating the valves 47.

A "third sensor" 97 is any means for acquiring the DOD and/or SOC of the battery (i.e. all or part of its cells or groups of cells), i.e. its charge level.

Thus:
the acquisition of the state of charge SOC may be done by the OCV (Open Circuit Voltage) method,
this third sensor 97 may comprise or be defined by a Battery Management System (BMS),
a battery monitor that may detect not only the battery voltage but also calculate the charge and discharge currents may be used. The integration of these currents will allow the battery monitor to calculate the state of charge of the battery. The battery monitor will be able to continuously measure the flow of current into and out of the battery.

Integrating this current over time will provide the net amount of Ah added or drawn to the data processing unit 83 (see below).

Each circuit integrating an assembly in accordance with the invention will in fact comprise a data processing unit 83, this unit being connected to said first and second temperature sensors 45, 79, to said third sensor 97, and to said means 81 for actuating the valves.

A relevant approach in terms of thermal management efficiency of battery 1, with anticipation, could then lead to at least some of the actions on the valves taking into account:
temperature data (Tcell) at least from the first temperature sensor 45, at least during said first time period,
temperature data (Tamb) at least from the second temperature sensor 79, at least during said second time period.

Thus, it will be possible to favour a predictive (anticipatory) management of the battery temperature during the said first period of time and, then, if this is not yet sufficient, to control the battery first from (at least) its temperature data, this during the said second period of time. Preferably, the data from the "third sensor" 97 for the acquisition of the DOD and/or the SOC will be provided continuously, whenever the battery is active, i.e. in electric charge and/or in electric discharge, both of which may be concomitant.

When the data processing unit 83 supplies the central computer of the vehicle with predictive management data anticipating a rapid recharging of the battery 1, for example at a motorway rapid recharging station, it may be provided that, a few minutes beforehand, the data processing unit 83 is controlled by this central computer to pilot a lowering of the temperature of the cells 10 of the battery 1 according to:
the outside temperature, via the sensor 79 (minimum and/or maximum temperature threshold(s) may have been defined),
the DOD and/or SOC states acquired by the third sensor 97.

In order to reduce the temperature of the cells 10 while they are active, the data processing unit 83 will control at least one fluid flow in at least one of said first passage 17/117, second passage 19/119 and peripheral passage 21, thus during said first time period. And it may only be, if the software entered in the data processing unit 83 concludes that the temperature reduction at the end of this first period of time is insufficient with respect to a predetermined threshold that at least two of said first, second and additional fluid supplies will be controlled, thus during a said second period of time.

As already mentioned, it is provided in the invention that the fluid flow control means 35, which are adapted for regulating the flow of the fluid(s) involved, act to ensure a circulation of fluid in thermal exchange:
via at least one of said first, second and additional fluid supplies 25, 27, 29, during a first period of time, and
via at least two of said first, second and additional fluid supplies, during a second period of time, which is of course later than, and therefore different from, the first period of time.

Even if there is no strict preference between the thermal exchanges to be established:
between the fluid(s) passing in said circuit and
the passages 17/117; 19/119 and 21 in circulation, it may be preferred, during the first period of time, to circulate the fluid(s) at least in the passages 17/117 or 21.

In this case, only in the second subsequent time period will the fluid(s) be made to flow in at least two of the passages 17/117 and 21, or 17/117 and 19/119, or 21 and 19/119.

And possibly in a third and still later period of time, one could circulate the fluid(s) in the three passages 17/117, 19/119 and 21.

Thus, a temperature criterion from at least one of the sensors 45,79 will prevail to initiate or even terminate each time period.

However, in order to prevent the effects of the external environment 39 as well as to avoid runaway of the battery pack 1 in case of overheating and/or to regulate it well in the preferred range of operation of the cells, it may be preferred, as illustrated in FIGS. 11-13, that after the pump or fan 41, in the direction of fluid flow from upstream to downstream (arrows), there are first said peripheral passages 21 and then said first passage 17/117 and/or second passage 19/119 of fluid.

As we understood it:
as are planned:
three passages, or series of passages, (17/117, 19/119, 21) for heat exchange between fluid and cells 10 or groups of cells 100, and
three supplies 27, 29, 25 of fluid(s), respectively,
as it is possible to use one or more fluids to circulate in these passages, or series of passages.

As preferred examples, four cases in particular are presented below in connection with FIGS. 1, 3 and 11-13.

First, in the circuit 85 of FIG. 11 only one fluid, such as air, F1 is used and supplied to the three fluid supplies 27, 29, 25.

If we assume air as the fluid, this air is taken from the outside (EXT). The fan 41 circulates it to the device 43 and if necessary the dehumidifier 430.

In the device 43, the air receives calories or frigories, in thermal exchange with a fluid F2 (this has not been reproduced in the other figures, except FIG. 1, so as not to overload the figure). As a supply 25 at the inlet of the passages 21, the fluid F1 is thus admitted at a temperature adapted to the expected supply of calories or frigories for the thermal management of the battery pack 1, at this stage.

For example, if the sensor 79 detects an outside temperature (Tamb) of at least 30° C., it may be provided that a programmed activation of the power supply 25 at the input of the passages 21 is automatically recorded in the memory of the computer (or of the data processing unit 83), during therefore said first period of time, which may, for example, be the one allowing, later, when Tamb detected is 15° C. for example, to ensure a recharge of the PCM 65 and thus that it is in the solid state (assumption of an PCM 65 provided to pass from solid to liquid at about 25-28° C., and vice versa) before the outside temperature:
becomes excessive (hot countries or summer; Tamb 35° C., for example),
and thermally impact the housing 71.

If the sensor(s) 45 now detect(s) a battery temperature (Tcell) of more than 29° C., it may be provided that two fluid supplies, such as those 27 and 29, or 27 and 25, are automatically activated during the said second period of time, which may, for example, be that which allows the temperature of the battery (Tcell) (or of at least one of its cells) detected by the sensor(s) 45 to fall back to below 27° C.

Note that this example could also be applied to "two-fluid" or "three-fluid" solutions, such as those shown in FIGS. 12 and 13 respectively.

In the solution of FIG. 11, depending on the temperature data from the sensor(s) 45 and/or 79 and thus on the time period (first or second period) considered, the data processing unit 83 may also control:

the exchange in the device 43 (fluid flow rate F2, inlet temperature, typically), at least as a function of the data provided at least by the outdoor temperature sensor 79, and/or the fan (or pump, if applicable) 41 so that the fluid flow rate F1 is suitable.

In the solution shown in FIG. 12, there is not one but two fluids F1, F3; air in the example.

Compared to the previous solution, the thermal management of the battery pack 1 via the power supply 25 at the inlet of the passages 21 (fluid F1) is carried out on a circuit 87 independent of that 85 of the power supplies and passages 27; 17/117 and 29; 19/119, which may remain identical to the previous solution of FIG. 11.

On the independent circuit 87, one may find:
a fluid connection 53 with the outside,
a fan 41 for circulation of the fluid towards a device 43 for supplying calories or frigories, then the passage(s) 21 with, at the outlet, a possible looping towards a valve 47 which may allow either recycling of at least part of the fluid F3, or its evacuation to the outside, and
the connections with the data processing unit 83.

It will therefore be possible to dissociate the thermal exchange in the passages 17/117 and/or 19/119 from that in the passage(s) 21.

In the solution shown in FIG. 13, there are three fluids F1, F3, F4, at least two of which are different: air (F1, F3) and water (F4) in the example.

The independent circuit 87 (fluid F3, passage(s) 21) remains. The circuit 85 is split into 85a (fluid F1, passage(s) 17/117) and 85b (fluid F4, passage(s) 19/119).

Thus, on each circuit, a fan 41 circulates the fluid to the device 43 (thermal exchange with a fluid F2) and if necessary the dehumidifier 430. As supply 25, 27 or 29, at the inlet of the passages 21, 17/117, 19/119, respectively, the fluid F1 is thus admitted at a temperature adapted to the supply of calories or frigories expected for the thermal management considered at this stage.

On each circuit 85a, 85b, a three-way valve 47, controlled by the data processing unit 83, as already explained, directs all or part of the flow F1 or F4 to:
at the entrance to passages 17/117 or 19/119, respectively, with, in each case, a possible bypass branch 89a or 89b.

In FIGS. 11-13, dotted lines on the circuits (branch 49 in FIG. 11) after the passages 21, 17/117, 19/119 indicate a possible at least partial recycling of the considered fluid via a valve 47:
which may be identical to the others,
which communicates with the outside air or a liquid source 69, and
which may also be controlled by the data processing unit 83.

In one of the single or two-fluid circuits (see for example the single-fluid circuit 85; see FIG. 11), where the peripheral fluid passage 21 is preferred before either the passages 17/117 and/or 19/119, or possible bypasses to respective bypass branches 91, it may be provided that the outlet of said peripheral fluid passage 21 communicates with the inlet:
the first fluid passage 17/117, and/or
the second fluid passage 19/119, so that fluid to be circulated therein is at least partly common.

Thus, at least one double thermal exchange stage (in two successive passages among the passages 17/117; 19/119 and 21) may be associated with a common fluid.

The circulation of the fluid F1 or F3, (substantially) at the outlet temperature of the calories or frigories supplying device 43, initially in the passage(s) 21 (see the one-fluid solution, as in FIG. 11) will initially ensure reinforced thermal insulation of the vehicle from the outside 39.

If one prefers to circulate, always (substantially) at the outlet temperature of the calories or frigories supplying device 43, the fluid F1 first in the passage(s) 17/117 (see two-fluid solution, as in FIG. 12), it will then be possible to ensure an anti-packing action of the cells first, thus avoiding a vaporisation of the electrolyte.

It will have been noted that this situation will arise if, after the device 43, the fluid F1 is directed to the branch 93 of the circuit to flow first in the first passage(s) 17/117, then in the second passage(s) 19/119 before being recycled or expelled to the outside 39 (gaseous fluid) or recovered in a tank (liquid).

It should be noted in this respect that, in particular if the fluid F1, F3 or F4 is liquid, it will be advantageous for the second fluid passage(s) 19/119 to communicate with a recycling circuit, in order to reintroduce into the second supply 29 at least part of the said fluid coming from the preceding passage in this second passage(s), after passing through the device 43 for supplying calories or frigories.

As schematically shown as examples in FIGS. 1 and 3, it will also be noted that, in a two or three fluid solution, as for example in FIG. 12 or 13, the independent circuit 87 could incorporate the second fluid passage(s) 19/119 in place of the passage(s) 21.

Upon exiting the passage(s) 17/117, the fluid concerned would either be recycled, back to the supply 27 to pass back into the first passage(s) 17/117, or directed to the supply 25.

In the examples described above in connection with the illustrations, only one fluid passes in the passages 17/117, 19/119 and/or 21.

However, a plurality of fluids may flow on the same side.

Figure 14:
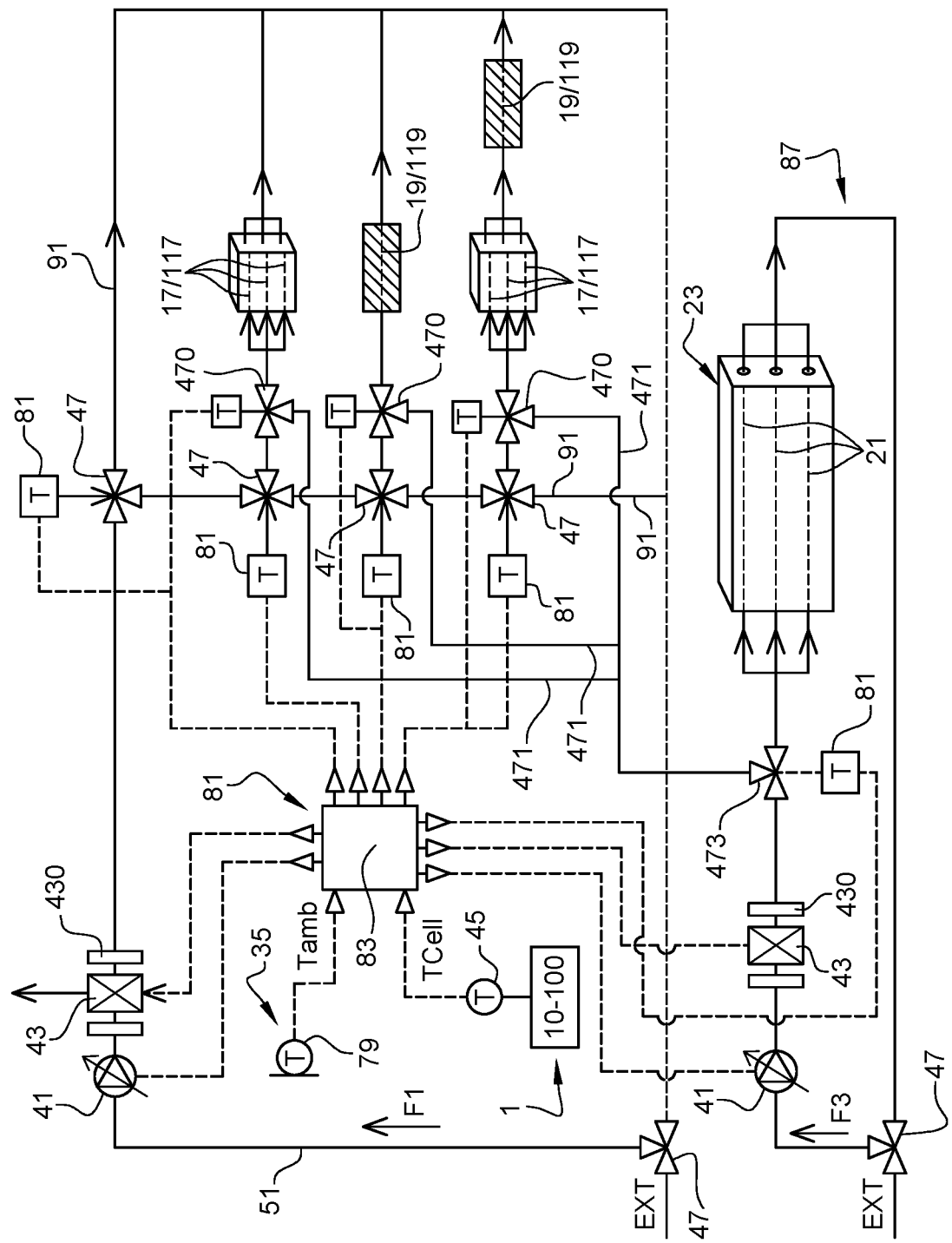
FIG. 14 and FIG. 15 refer to a multi-fluid variant.
Figure 15:
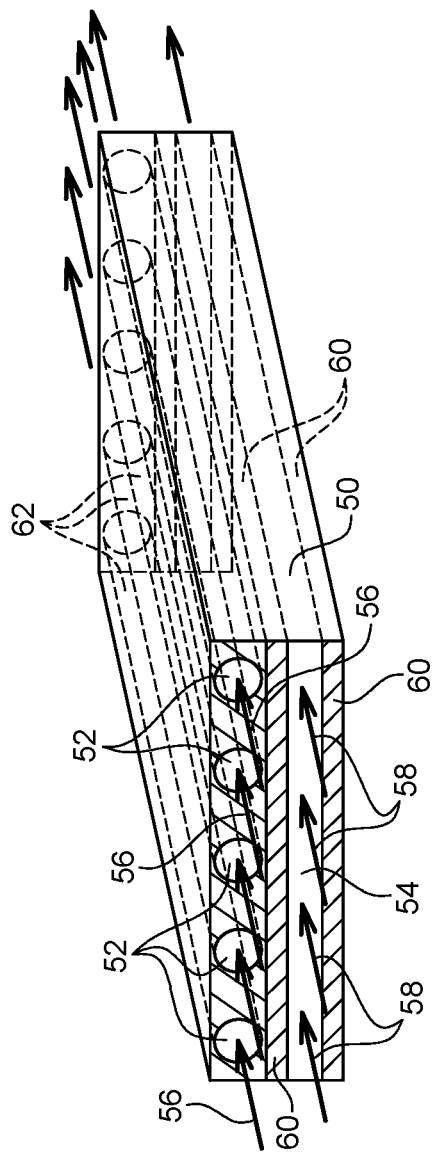

FIGS. 14 and 15 illustrate a situation in which at least two fluids are used for cooling or heating the battery in question. FIG. 14 shows the complete assembly of FIG. 12 and completes it.

For example, the following may be provided:
a first fluid 25 circulates in the external barrier of the battery (may extend along a plurality of external walls 23 provided with peripheral passage(s) 21) and a second fluid circulates in the inter-cell and/or sub-cell parts, on at least one side: second fluid in the first fluid passage(s) 17/117 and/or in the second fluid passage(s) 19/119.
in addition, as shown in FIG. 15, one or two fluids are, simultaneously or not, circulated in a group of passages, 17/117, 19/119 and/or 21.
Thus, if one may imagine:
the wall 50 of FIG. 15 as corresponding to any one of the aforementioned walls crossed by said passages 17/117, 19/119 and/or 21 (wall 61, 67a-67b, 67c-67d, 23 . . . ), and
these passages 17/117, 19/119 and/or 21 marked respectively 52, 54 for two groups of them in each case, it being possible for a first fluid 56 to circulate in the first group of passages 52 and/or for a second fluid 58 (different from the first fluid 56) to circulate in the second group of passages 54.

The first fluid 56 will be one of the fluids of the first, second or said additional fluid supply 25,27,29. The second fluid 58 will be one of the additional fluids in these same supplies.

Since the first and second groups of passages 52, 54 do not communicate, the two supply fluids 56, 58 do not mix.

Thus, the two supply fluids 56,58 may be of different natures (air and glycol water, for example). The circulation may be controlled by the battery temperature (sensor 45, means 81 for actuating the valves and data processing unit 83, in particular). The combination of the two fluids or the use of one or the other may depend on the level of dissipation of the 10-100 cells which will induce a temperature rise.

It could be agreed that in normal operation, for example, only air may be circulated in the second group of passages 54 and that in critical operation (overheating) or rapid charging of the battery 1, glycolated water circulates in the first group of passages 52.

For the efficiency of the solution (increase in thermal exchange and exchange surfaces involved), at least one of said passages or group of passages 52, 54 is bordered by, and is thus in contact with, a phase change material 60 with which it is thus in thermal exchange when fluid is flowing.

In the example, two panels containing PCM 60 define, on two opposite sides, the respective upper and lower boundaries of a single fluid passage forming said second group of passages 54.

The first group of passages 52 is defined by a series of tubes arranged in parallel in the wall 50.

Different fluid supplies may flow through it without mixing.

The wall 50 may itself contain PCM, either as a substitute for or in addition to the PCM 60.

In FIG. 14, valves 470, located downstream of the valves 47 for access to the passages 17/117; 19/119, allow, in the example, via taps 471 and another three-way valve 473 located at the inlet of the passages 21, to bring one or the other of the supply fluids 27, 29 at the inlet of the passages 21.

The valve 473 is located downstream of the calories or frigories supplying device 43 of the independent circuit 87.

The valves 470, 473 are controlled by the valve operating means 81 and by the data processing unit 83, as are the other valves 47.

Thus, in this example, and assuming the passage(s) 21 as corresponding to the second group of passages 54 and the wall 23 as corresponding to the wall 50 provided with the first group of passages 52, it will be possible to obtain
that during a first operating period one of the supply fluids 27, 29 supplies the passages 54/21, and
that during a second operating period the other of the supply fluids 27, 29 or the supply fluid 25 supplies the added passages 52.

The assembly of FIG. 11, with the additions of FIG. 14 to FIG. 12, could also have been used as a basis for the realization of such a solution where a plurality of fluids may circulate on the same side.

The invention claimed is:

1. An assembly comprising:
a plurality of cells (10) or of groups (100) of cells of an electric vehicle battery (1), of which at least:
a first cell and a second cell separated from each other by a gap (15), or
a first group of cells and a second group of cells separated from each other by a gap (115),
at least two of:
at least one first fluid passage (17, 117) passing in said space (15, 115), and located between two opposing first sides (11a, 13; 111a, 113a) which face each other:
on the first cell and of the second cell (11, 13) respectively, or
on the first and second groups (111, 113) of cells respectively, the first passage (17, 117) being connected to a first supply (27) of fluid to be circulated in thermal exchange with the first and second cells or the first and second groups of cells, at least one second fluid passage (19, 119) located on second sides (11b, 111b, 113b):
of the first cell and of the second cell respectively, or
of the first and second groups of cells respectively, and, at least one peripheral passage (21) of fluid located around the cells (10) or groups (100) of cells, in thermal exchange with them, on sides (643) thereof other than said first sides (11a, 13;111a, 113a) of the cells or groups of cells, respectively, said peripheral fluid passage (21) being connected to an additional supply (25) of fluid to be circulated in thermal exchange with said cells or groups of cells, and a thermal insulator (33) located such that said second fluid passage (19, 119) and/or the peripheral fluid passage (21) is interposed between the thermal insulator (33) and:
at least the first and second cells, or
at least the first and second groups (640') of cells,
the second fluid passage (19, 119) being connected to a second supply (29) of fluid to be circulated in thermal exchange with the first and second cells or with the first and second groups of cells.

2. The assembly according to claim 1, which further comprises fluid flow control means (35, 41, 45, 47, 79, 81, 83, 97) operative to ensure the circulation of fluid in said thermal exchange:
via at least one of the first, second and further fluid supplies, during a first period of time, and
via at least two of the first, second and further fluid supplies, during a second period of time.

3. The assembly according to claim 1, which further comprises fluid flow control means (35,41,45,47,79,81,83, 97) operative to provide a circulation of fluid in said thermal exchange and comprising:
valves (47) on the first, second and/or other fluid supplies (25, 27, 29), and
means (45, 79, 81, 83, 97) for controlling the valves acting as a function of temperature data of said cells (10) or groups (100) of cells and/or data relating to the charge or discharge of the battery.

4. The assembly according to claim 1, wherein:
between two opposite said first sides (11a, 13; 111a, 113a) facing each other, or
on said second sides (11b, 111b, 113b), or
on said sides (100d, 111d) other than the first sides of the cells or groups of cells, respectively, there are arranged a plurality of first fluid passages (17, 117) or a plurality of second fluid passages (19, 119) or a plurality of circumferential fluid passages (21), respectively, separated from each other, so that different fluids can flow through it without mixing with each other.

5. The assembly according to claim 4, wherein at least one of said plurality of first fluid passages (17,117), or a plurality of second fluid passages (19,119), or a plurality of peripheral fluid passages (21) is arranged in contact with a phase-change material (60) with which it is in thermal exchange when fluid is flowing.

6. The assembly according to claim 1, which further comprises a device (43) for supplying calories or frigories with which at least one of said fluids is placed in thermal exchange, upstream of the thermal exchange with the cells (10) or groups (100) of cells, so as to adapt the temperature of said fluid.

7. An assembly comprising:
a plurality of cells or of groups of cells of an electric vehicle battery (1), of which at least:
a first cell and a second cell separated from each other by a gap (15), or
a first group and a second group of cells separated from each other by a gap (115), at least one structure (61) containing a phase change material (65), the structure being arranged between two opposite first sides (111a, 113a) which face each other:
on the first cell and of the second cell respectively, or
on the first group and second group of cells respectively,
or at least one additional structure (61) containing a phase-change material (65) arranged around the cells (10) or groups (100) of cells, and at least two of:
a first fluid passage (17,117) passing in said space (15,115), the first fluid passage being connected to a first fluid supply (27),
a second fluid passage (19,119) located on second sides (11b;111b,113b):
of the first cell and of the second cell (11,13) respectively, or
of the first and second groups (111, 113) of cells respectively, and
a peripheral fluid passage (21) in said additional structure (61), said peripheral fluid passage being connected to an additional supply (25), on sides (100d, 111d) other than said first sides of the cells or groups of cells respectively, and a thermal insulator (33) located such that said second fluid passage (19,119) or peripheral fluid passage (21) is interposed between the thermal insulator (33) and:
at least the first and second cells, or
at least the first and second groups of cells,
the second fluid passage being connected to a second supply (29) of fluid to be circulated in thermal exchange with the first and second cells or the first and second groups of cells, and in said space (15), the fluid being to be circulated in thermal exchange with the phase change material (65) of said structure (61), and/or
in said peripheral fluid passage (21), the fluid being to be circulated in thermal exchange with the phase change material of said additional structure.

8. The assembly according to claim 7, which further comprises a device (43) for supplying calories or frigories placed in heat exchange with at least one of said fluids, upstream of the thermal exchange with the cells (10) or groups (100) of cells, so as to adapt the temperature of said fluid in accordance with the desired state of the phase-change material (65).

9. The assembly according to claim 7, wherein said peripheral fluid passage (21) communicates with:
the first fluid passage (17, 117), and/or
the second fluid passage (19, 119), so that fluid to be circulated therein is at least partly common.

10. The assembly according to claim 7 which comprises, for the thermal management of the battery (1), a plurality of thermal control circuits including:
a first circuit which comprises said at least one first fluid passage (17, 117) and which passes between two adjacent cells,
a second circuit comprising said peripheral fluid passage (21) and passing around a stack of cells, and a third circuit which comprises said second fluid passage (19,119) and which passes:
  along a face of the cell(s) other than the one along which the first circuit (17, 117) passes,
  or possibly also along a face of the cell(s) other than that along which the second circuit (21) passes.

11. The assembly according to claim 7, which further comprises fluid flow control means (35, 41, 45, 47, 79, 81, 83, 97) operative to ensure the circulation of fluid in said thermal exchange:
  via at least one of the first, second and further fluid supplies, during a first period of time, and
  via at least two of the first, second and further fluid supplies, during a second period of time.

12. The assembly according to claim 7, which further comprises fluid flow control means (35,41,45,47,79,81,83, 97) operative to provide a circulation of fluid in said thermal exchange and comprising:
  valves (47) on the first, second and/or other fluid supplies (25, 27, 29), and
  means (45, 79, 81, 83, 97) for controlling the valves acting as a function of temperature data of said cells (10) or groups (100) of cells and/or data relating to the charge or discharge of the battery.

13. A vehicle disposed in an outdoor environment (39) and comprising an assembly, comprising:
  a plurality of cells (10) or of groups (100) of cells of an electric vehicle battery (1), of which at least:
    a first cell and a second cell separated from each other by a gap (15), or
    a first group of cells and a second group of cells separated from each other by a gap (115);
  at least two of:
    at least one first fluid passage (17, 117) passing in said space (15, 115), and located between two opposing first sides (11a, 13; 111a, 113a) which face each other:
      on the first cell and of the second cell (11, 13) respectively, or
      on the first and second groups (111, 113) of cells respectively, the first passage (17, 117) being connected to a first supply (27) of fluid to be circulated in thermal exchange with the first and second cells or the first and second groups of cells,
    at least one second fluid passage (19, 119) located on second sides (11b, 111b, 113b):
      of the first cell and of the second cell respectively, or
      of the first and second groups of cells respectively, and,
    at least one peripheral passage (21) of fluid located around the cells (10) or groups (100) of cells, in thermal exchange with them, on sides (643) thereof other than said first sides (11a, 13;111a, 113a) of the cells or groups of cells, respectively, said peripheral fluid passage (21) being connected to an additional supply (25) of fluid to be circulated in thermal exchange with said cells or groups of cells;
  a thermal insulator (33) located such that said second fluid passage (19, 119) and/or the peripheral fluid passage (21) is interposed between the thermal insulator (33) and:
    at least the first and second cells, or
    at least the first and second groups (640') of cells; and
  fluid flow control means (35,41,45,47,79,81,83,97) operative to provide a circulation of fluid in said thermal exchange and comprising:
    valves (47) on the first, second and/or other fluid supplies (25, 27, 29), and
    means (45, 79, 81, 83, 97) for controlling the valves acting as a function of temperature data of said cells (10) or groups (100) of cells and/or data relating to the charge or discharge of the battery;
    the second fluid passage (19, 119) being connected to a second supply (29) of fluid to be circulated in thermal exchange with the first and second cells or with the first and second groups of cells, wherein the means for controlling the valves (45,79,81,83,97) comprises:
    a first temperature sensor (45) for sensing the temperature at or near said cells or groups of cells, and
    a second temperature sensor (79) for sensing the temperature of the environment outside the vehicle,
    means (81) for actuating the valves, and
    a data-processing unit (83) connected to said first and second temperature sensors and to said valve operating means, so that at least some of the actions on the valves take into account temperature data from the first temperature sensor (45) and/or the second temperature sensor (79).

14. The vehicle according to claim 13, wherein the data processing unit (83) acts to provide a fluid flow in said thermal exchange:
  via at least one of the first, second and further supplies (27,29,25) of fluid, during a first period of time, and
  via at least two of the first, second and further fluid supplies (27,29,25), during a second period of time, and takes into account:
  temperature data from at least the second temperature sensor (79) during at least the first time period,
  temperature data from at least the first temperature sensor (45) during at least the second time period.

15. The vehicle according to claim 13, wherein:
  the means (45, 79, 81, 83, 97) for controlling the valves furthermore comprise at least one third sensor (97) for acquiring data relating to the depth of discharge (DOD) of the battery, and/or to the state of charge (SOC) of the battery, and
  the data processing unit (83) is connected to the said at least one third sensor (97) so that at least some of the actions on the valves take account of data acquired by the third sensor (97).

16. The vehicle according to claim 13, wherein the valve control means for controlling the valves(45,79,81,83,97) comprises:
  at least one sensor (97) for acquiring data relating to the depth of discharge (DOD) of the battery, and/or to the state of charge (SOC) of the battery,
  means (81) for actuating the valves, and
  a data processing unit (83) connected to the said at least one sensor (97), so that at least some of the actions on the valves (47) take account of data acquired by the said sensor (97) for acquiring the data relating to the depth of discharge of the battery, and/or to the state of charge of the battery.

17. The vehicle according to claim 13, comprising the second fluid passage (19,119), which passes between two thermally conductive plates (67a,67b), or two series of thermally conductive plates (67c,67d) defining a plurality of said second fluid passages (19,119) arranged in parallel,
  said fluid (15) to be circulated in the first fluid passage (17, 117) is a first fluid,
  said fluid (15) to be circulated in the second fluid passage (19,119) is a second fluid different from the first fluid, and, the first and second fluids flow in separate circuits (85, 87).

18. The vehicle according to claim 17, wherein:

the second fluid passage (19, 119) and said plates (67*a*, 67*b*; 67*c*, 67*d*) are arranged under the electric battery, and said fluid, or at least one of the fluids, to be circulated in the second fluid passage(s) (19, 119) is a liquid.

19. The vehicle according to claim 13, which comprises:

the second fluid passage (19, 119), and at least one recycling in which the second fluid passage (19, 119) communicates with a recirculation circuit, for reintroducing into the second supply (29) at least part of the said fluid coming from the second fluid passage, after passing through the device (43) for supplying calories or frigories to the assembly according to claim 5 or 6.

20. The vehicle according to claim 13, in which:

the fluid flow control means (35, 41, 45, 47, 79, 81, 83, 97) further comprise at least one pump or fan (41) for the circulation of the fluid(s), and, wherein, after the pump or fan, in the direction of fluid circulation from upstream to downstream, there are, firstly said peripheral passages (21) and then said first fluid passage and/or second fluid passage, so that the fluid flows first into said other supply (25) of fluid and then into the first fluid supply (27) and/or into the second fluid supply (29).

* * * * *